United States Patent
Benson et al.

(10) Patent No.: US 12,056,331 B1
(45) Date of Patent: Aug. 6, 2024

(54) SYSTEMS AND METHODS FOR PROVIDING A USER INTERFACE THAT FACILITATES PROVENANCE TRACKING FOR INFORMATION EXTRACTED FROM ELECTRONIC SOURCE DOCUMENTS

(71) Applicant: Instabase, Inc., Dover, DE (US)

(72) Inventors: Edward Oscar Benson, San Francisco, CA (US); Aaron Richard Vontell, Boston, MA (US); David Edgar Lluncor, San Francisco, CA (US); Anant Bhardwaj, San Francisco, CA (US)

(73) Assignee: Instabase, Inc., Dover, DE (US)

( * ) Notice: Subject to any disclaimer, the term of this patent is extended or adjusted under 35 U.S.C. 154(b) by 0 days.

(21) Appl. No.: 16/678,321

(22) Filed: Nov. 8, 2019

(51) Int. Cl.

| | |
|---|---|
| *G06F 3/0482* | (2013.01) |
| *G06F 3/0484* | (2022.01) |
| *G06F 40/106* | (2020.01) |
| *G06F 40/109* | (2020.01) |
| *G06V 30/18* | (2022.01) |
| *G06Q 10/10* | (2023.01) |

(52) U.S. Cl.
CPC .......... *G06F 3/0482* (2013.01); *G06F 3/0484* (2013.01); *G06F 40/106* (2020.01); *G06F 40/109* (2020.01); *G06V 30/18* (2022.01); *G06Q 10/10* (2013.01)

(58) Field of Classification Search
CPC .... G06F 3/0482; G06F 3/0484; G06F 17/212; G06F 17/214; G06K 9/46; G06K 2209/01; G06Q 10/10

USPC ........................................................ 715/744
See application file for complete search history.

(56) References Cited

U.S. PATENT DOCUMENTS

| | | | |
|---|---|---|---|
| 5,848,184 A | 12/1998 | Taylor | |
| 5,898,795 A | 4/1999 | Bessho | |
| 7,689,431 B1* | 3/2010 | Carmel | G06F 40/253 |
| | | | 705/1.1 |
| 7,720,318 B1* | 5/2010 | Phinney | G06T 1/0021 |
| | | | 382/187 |
| 7,725,423 B1 | 5/2010 | Pricer | |
| 8,254,681 B1 | 8/2012 | Poncin | |
| 9,275,030 B1 | 3/2016 | Fang | |
| 9,607,058 B1* | 3/2017 | Gupta | G06V 10/235 |
| 10,679,089 B2 | 6/2020 | Annis | |

(Continued)

OTHER PUBLICATIONS

Doermann et al., "Image Based Typographic Analysis of Documents", Proceedings of 2nd International Conference on Document Analysis and Recognition, pp. 769-773, 1993 IEEE. (Year: 1993).*

(Continued)

*Primary Examiner* — Hwei-Min Lu
(74) *Attorney, Agent, or Firm* — Esplin & Associates, PC (57) ABSTRACT

Systems and methods for providing a user interface that facilitates provenance tracking for information extracted from electronic source documents are disclosed. Exemplary implementations may: obtain an electronic source document in electronic format; obtain extracted information that has been extracted from the electronic source document; present the user interface on the client computing platform to the user; receive user input from the user through the user interface; and present one or more graphical user interface elements, responsive to the selection.

14 Claims, 5 Drawing Sheets

(56) References Cited

U.S. PATENT DOCUMENTS

| | | | |
|---|---|---|---|
| 2002/0064316 A1 | 5/2002 | Takaoka | |
| 2004/0181749 A1* | 9/2004 | Chellapilla | G06F 40/174 715/222 |
| 2004/0223648 A1* | 11/2004 | Hoene | G06F 40/194 382/218 |
| 2005/0289182 A1* | 12/2005 | Pandian | G06Q 10/10 |
| 2007/0277090 A1* | 11/2007 | Raja | G06F 40/151 715/212 |
| 2008/0148144 A1 | 6/2008 | Tatsumi | |
| 2008/0212901 A1* | 9/2008 | Castiglia | G06V 10/987 382/311 |
| 2008/0291486 A1 | 11/2008 | Isles | |
| 2009/0076935 A1* | 3/2009 | Knowles | G06Q 20/102 705/30 |
| 2009/0132590 A1 | 5/2009 | Huang | |
| 2012/0072859 A1* | 3/2012 | Wang | G06V 30/40 715/764 |
| 2012/0204103 A1* | 8/2012 | Stevens | G06Q 10/10 715/273 |
| 2014/0195416 A1* | 7/2014 | Linscott | G06Q 20/023 705/39 |
| 2014/0200880 A1* | 7/2014 | Neustel | G06F 40/279 704/9 |
| 2014/0214732 A1* | 7/2014 | Carmeli | G16H 10/60 706/12 |
| 2015/0012422 A1* | 1/2015 | Ceribelli | G06Q 20/102 705/40 |
| 2015/0169951 A1* | 6/2015 | Khintsitskiy | G06V 30/418 382/182 |
| 2015/0169995 A1* | 6/2015 | Panferov | G06V 30/414 382/220 |
| 2015/0278197 A1* | 10/2015 | Bogdanova | G06F 40/211 704/9 |
| 2016/0014299 A1 | 1/2016 | Saka | |
| 2016/0275526 A1* | 9/2016 | Becanovic | G06F 16/48 |
| 2018/0189592 A1 | 7/2018 | Annis | |
| 2018/0329890 A1 | 11/2018 | Ito | |
| 2019/0286900 A1* | 9/2019 | Pepe, Jr. | G06Q 10/10 |
| 2020/0089946 A1 | 3/2020 | Mallick | |
| 2020/0104359 A1* | 4/2020 | Patel | G06F 16/313 |
| 2020/0364343 A1 | 11/2020 | Atighetchi | |
| 2021/0258448 A1 | 8/2021 | Yuusuke | |
| 2023/0334889 A1 | 10/2023 | Cahn | |

OTHER PUBLICATIONS

Chaudhuri et al., "Extraction of type style-based meta-information from imaged documents", IJDAR (2001) 3: 138-149. (Year: 2001).*

Slavin et al., "Matching Digital Documents Based on OCR", 2019 XXI International Conference Complex Systems: Control and Modeling Problems (CSCMP), pp. 177-181, published on Sep. 1, 2019. (Year: 2019).*

Shafait ("Document image analysis with OCRopus," IEEE 13th International Mulititopic Conference; Date of Conference: Dec. 14-15, 2009) (Year: 2009).

Singh et al. (A Proposed Approach for Character Recognition Using Document Analysis with OCR, Second InternationalConference on Intelligent Computing and Control Systems: Date of Conference: Jun. 14-15, 2018) (Year: 2018).

* cited by examiner

| NAME | |
|---|---|
| 43 → | John Johnson |

| ACCOUNT NUMBER | |
|---|---|
| | 0000030002001 |

| BEGINNING BALANCE | |
|---|---|
| | $1000.00 |

| ENDING BALANCE | |
|---|---|
| | $840.00 |

ADDRESS 👁

| | |
|---|---|
| 44 → | 122 Main Street |

*BIG BANK*
P O Box 1
Somecity, XY

John Johnson
123 Main Street
Anytown, USA

Date: 02/01/XX through 02/08/XX
Account Number: 000 00 300 02 001

CUSTOMER SERVICE INFORMATION
Website              bigbank.com
Service center       1-800-123-4567
International calls  1-123-456-7890

| CHECKING SUMMARY | AMOUNT |
|---|---|
| Beginning Balance | $1000.00 |
| Deposits and Additions | 100.00 |
| Checks Paid | -50.00 |
| ATM & Debit Card Withdrawals | -200.00 |
| Electronic Withdrawals | 0 |
| Fees | -10.00 |
| Ending Balance | $840.00 |

CHECKS PAID

| CHECK NUMBER | DATE PAID | AMOUNT |
|---|---|---|
| 1234 | 02/03 | $50.00 |

TRANSACTION DETAIL

| DATE | DESCRIPTION | AMOUNT |
|---|---|---|
| 02/04 | ATM withdrawal | $200.00 |

*Fig. 4* informational element 51

NAME
John Johnson

ACCOUNT NUMBER
0000030002001

BEGINNING BALANCE
$1000.00

ENDING BALANCE
$840.00

44
ADDRESS
122 Main ~~Street~~

Element 53

*BIG BANK*
P O Box 1
Somecity, XY

John Johnson
123 Main Street
Anytown, USA

Date: 02/01/XX through 02/08/XX
Account Number: 000 00 300 02 001

CUSTOMER SERVICE INFORMATION
Website          bigbank.com
Service center   1-800-123-4567
International calls  1-123-456-7890

| CHECKING SUMMARY | AMOUNT |
|---|---|
| Beginning Balance | $1000.00 |
| Deposits and Additions | 100.00 |
| Checks Paid | -50.00 |
| ATM & Debit Card Withdrawals | -200.00 |
| Electronic Withdrawals | 0 |
| Fees | -10.00 |
| Ending Balance | $840.00 |

CHECKS PAID

| CHECK NUMBER | DATE PAID | AMOUNT |
|---|---|---|
| 1234 | 02/03 | $50.00 |

TRANSACTION DETAIL

| DATE | DESCRIPTION | AMOUNT |
|---|---|---|
| 02/04 | ATM withdrawal | $200.00 | informational element 52

*Fig. 5*

SYSTEMS AND METHODS FOR PROVIDING A USER INTERFACE THAT FACILITATES PROVENANCE TRACKING FOR INFORMATION EXTRACTED FROM ELECTRONIC SOURCE DOCUMENTS

FIELD OF THE DISCLOSURE

The present disclosure relates to systems and methods for providing a user interface that facilitates provenance tracking for information extracted from electronic source documents.

BACKGROUND

User interfaces for providing electronic documents are known. Recognizing alphanumerical characters in a photographed or scanned document is known, e.g. through optical character recognition (OCR).

SUMMARY

One aspect of the present disclosure relates to a system configured for providing a user interface that facilitates provenance tracking for information extracted from electronic source documents. The system may include one or more hardware processors configured by machine-readable instructions. The processor(s) may be configured to obtain an electronic source document in electronic format. The electronic format may be such that, upon presentation of the electronic source document through a client computing platform to a user, the electronic source document as presented may include human-readable information. The processor(s) may be configured to obtain extracted information that has been extracted and/or otherwise derived from the electronic source document. The extracted information may include a set of character sequences. Characters may include alphanumerical characters, language-specific characters, emojis, and/or other characters. The processor(s) may be configured to present the user interface on the client computing platform to the user. The user interface may include a first portion. The first portion may include a visual representation that represents the electronic source document such that the visual representation includes the human-readable information. The user interface may include a second portion. The second portion may include a set of fields. Individual fields may include individual character sequences from the extracted information. The processor(s) may be configured to receive user input from the user through the user interface. The user input may represent a selection by the user of a particular field from the presented set of fields. The particular field may include a particular character sequence from the extracted information. The processor(s) may be configured to present one or more graphical user interface elements, responsive to the selection. The one or more graphical user interface elements may be superimposed on the visual representation in the first portion of the user interface such that the one or more graphical user interface elements correspond to a particular section of the electronic source document from which the particular character sequence has been extracted.

Another aspect of the present disclosure relates to a method for providing a user interface that facilitates provenance tracking for information extracted from electronic source documents. The method may include obtaining an electronic source document in electronic format. The electronic format may be such that, upon presentation of the electronic source document through a client computing platform to a user, the electronic source document as presented may include human-readable information. The method may include obtaining extracted information that has been extracted and/or otherwise derived from the electronic source document. The extracted information may include a set of character sequences. In some implementations, the extracted information may have a semantic meaning, including but not limited to opinions, judgement, classification, and/or other meaning that may be attributed to human interpretation. The method may include presenting the user interface on the client computing platform to the user. The user interface may include a first portion. The first portion may include a visual representation that represents the electronic source document such that the visual representation includes the human-readable information. The user interface may include a second portion. The second portion may include a set of fields. Individual fields may include individual character sequences from the extracted information. The method may include receiving user input from the user through the user interface. The user input may represent a selection by the user of a particular field from the presented set of fields. The particular field may include a particular character sequence from the extracted information. The method may include presenting one or more graphical user interface elements, responsive to the selection. The one or more graphical user interface elements may be superimposed on the visual representation in the first portion of the user interface such that the one or more graphical user interface elements correspond to a particular section of the electronic source document from which the particular character sequence has been extracted.

As used herein, any association (or relation, or reflection, or indication, or correspondency) involving servers, processors, client computing platforms, documents, formats, presentations, extracted information, user interfaces, user interface elements, portions, fields, character sequences, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form

DETAILED DESCRIPTION

Figure 1:
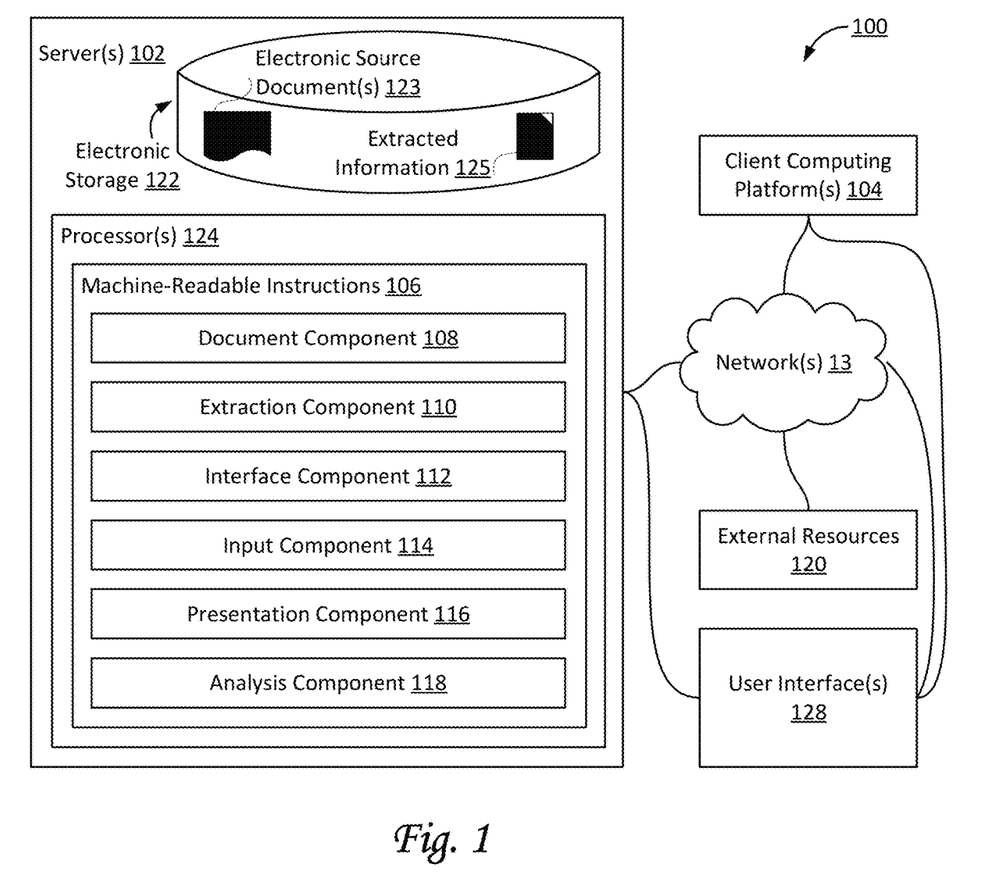
FIG. 1 illustrates a system configured for providing a user interface that facilitates provenance tracking for information extracted from electronic source documents, in accordance with one or more implementations.

FIG. 1 illustrates a system 100 configured for providing a user interface 128 that facilitates provenance tracking for information extracted from electronic source documents 123, in accordance with one or more implementations. As used herein, the term "provenance" refers to a source or origin of particular information. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of document component 108, extraction component 110, interface component 112, input component 114, presentation component 116, analysis component 118, and/or other instruction components.

Document component 108 may be configured to obtain and/or retrieve documents, including but not limited to electronic documents, including scanned images, captured photographs, and/or other documents. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source or a basis or a container for human-readable information. By way of non-limiting example, human-readable information may include characters and/or other information. In some implementations, characters may be grouped and/or otherwise organized into character sequences. By way of non-limiting example, such sequences may represent names, numbers, strings, and/or other information. For example, a particular electronic source document 123 may represent a bank statement. For example, a particular electronic source document 123 may represent a financial record. For example, a particular electronic source document 123 may be a photocopy of a physical document from a government agency. For example, a particular electronic source document 123 may include and/or be a captured and/or generated image and/or video.

In some implementations, document component 108 may be configured to obtain one or more electronic source documents 123. For example, an obtained electronic document may be in a particular electronic format. By way of non-limiting example, the electronic format may be the Portable Document Format, or pdf. For example, the obtained electronic document may have a particular size and/or resolution. The particular electronic format may be such that, upon presentation of a particular electronic source document 123 through client computing platform 104 to a user, the particular electronic source document 123 as presented includes human-readable information. In other words, the particular electronic format may be suitable and/or intended for human readers, and not, for example, a binary format that is not suitable for human readers. For example, the electronic format referred to as "pdf" is suitable and intended for human readers when presented using a particular application (e.g., an application referred to as a "pdf reader").

Figure 3:
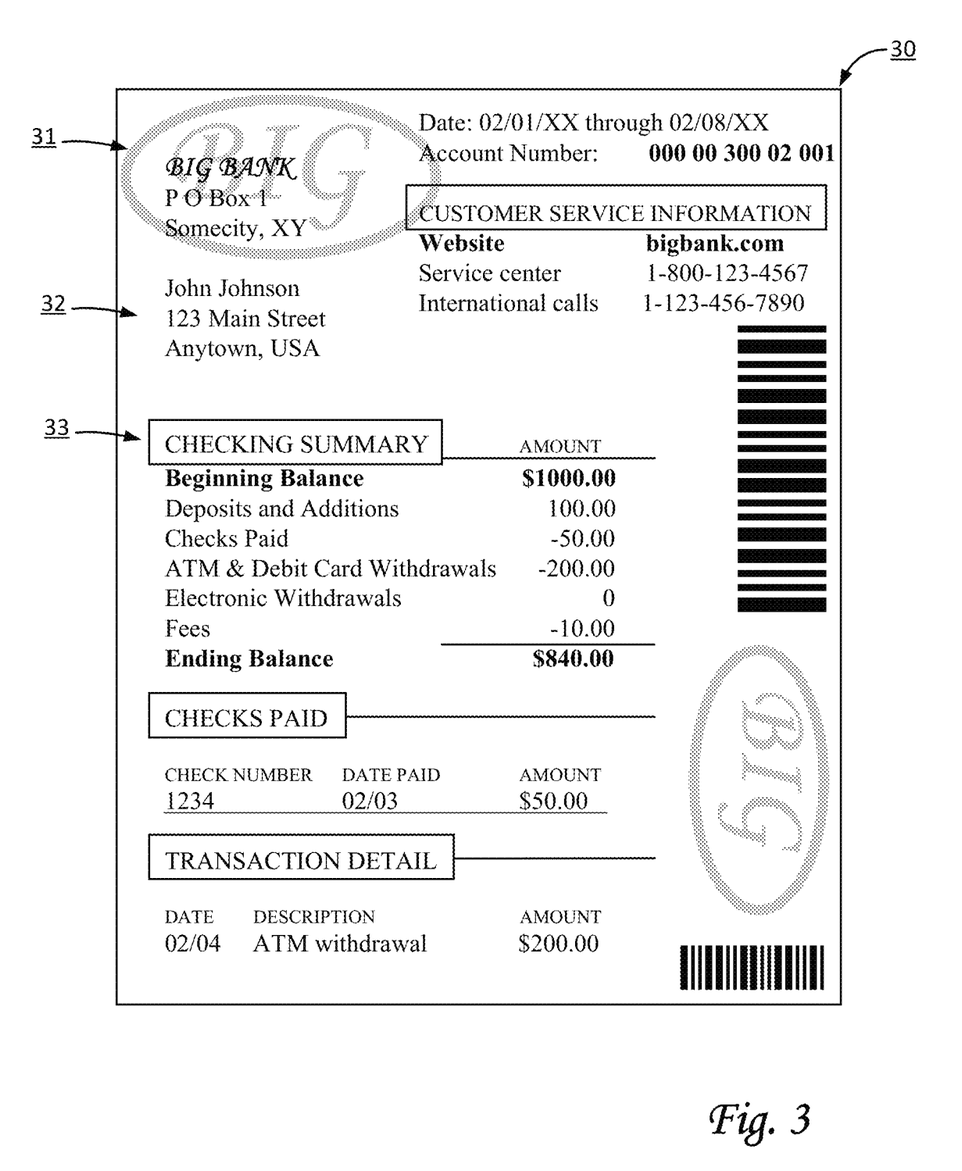
FIG. 3 illustrates an exemplary electronic document as may be used in a system configured for providing a user interface that facilitates provenance tracking for information extracted from electronic source documents, in accordance with one or more implementations.

By way of non-limiting example, FIG. 3 illustrates an exemplary electronic source document 30 as may be used in system 100 (of FIG. 1), in accordance with one or more implementations. Exemplary electronic source document 30 may represent a bank statement from a particular bank, intended for a particular account holder, regarding a particular account of the particular account holder with the particular bank. The bank statement may include various familiar elements, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement.

Referring to FIG. 1, extraction component 110 may be configured to obtain, retrieve, produce, and/or generate extracted information 125 that has been extracted and/or otherwise derived from documents, including but not limited to electronic source documents 123. As used herein, the term "extract" and its variants refer to the process of identifying and/or interpreting information that is included in a document, whether performed by determining, measuring, calculating, computing, estimating, approximating, interpreting, generating, and/or otherwise deriving the information, and/or any combination thereof. In some implementations, the extracted information may have a semantic meaning, including but not limited to opinions, judgement, classification, and/or other meaning that may be attributed to human interpretation. For example, in some implementations, extracted information need not literally be included in a particular electronic source document, but may be a conclusion, classification, and/or other type of result of (human and/or machine-powered) interpretation of the contents of the particular electronic source document. In some implementations, the extracted information may have been extracted by a document analysis process that includes optical character recognition (OCR). Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the claimed scope, and the results of these particular document analysis processes, e.g., the extracted information, may be obtained and/or retrieved by extraction component 110.

In some implementations, extracted information 125 may include one or more sets of character sequences. By way of non-limiting example, such sequences may represent names, numbers, strings, and/or other information. In some implementations, extracted information 125 may include meta-information regarding individual ones of the characters or character sequences. By way of non-limiting example, the meta-information regarding an individual of the character sequences may include one or more of font type, font size, font weight, font color, typographical emphasis (e.g., italic, bold, etc.), letter case, capitalization, margins, alignment, spacing, and/or other meta-information. In some implementations, the meta-information may further include indications of levels of confidence in the reliability of the document analysis process used to extract particular extracted information. For example, the meta-information of an extracted character sequence may include an indication of the level of confidence (as determined by the document analysis process itself) in the accuracy of the results. For example, the meta-information of an extracted character sequence may include an indication of reliability (as determined by the document analysis process itself) of the results. For example, the meta-information of an extracted character sequence may include an indication of the level of accuracy (as determined by the document analysis process itself) of the results. In some implementations, the meta-information of an item of extracted information may represent a level of confidence of a machine-learning technique and/or rule-based technique used in a particular document analysis process. In some implementations, the meta-information of an item of extracted information may represent a sentiment attributed to some or all of the electronic source document. In some implementations, one or more of these indications may be represented by low, medium, or high levels. In some implementations, one or more of these indications may be represented, from low to high, by red, yellow, or green levels. In some implementations, one or more of these indications may be represented by numerical values between, say, 0 and 100, with 100 being the highest level (of confidence, reliability, accuracy, and/or other quality indications).

In some implementations, extracted information 125 may include one or more sets of positional coordinates that specify positions within electronic source document 123. In some implementations, obtaining the extracted information by extraction component 110 may include obtaining one or more sets of extracted information that has been extracted from one or more electronic source documents 123. In some implementations, individual positional coordinates may be related to individual characters or character sequences. In some implementations, extracted information 125 may include one or more images and/or other media.

Referring to FIG. 3, extracted information from exemplary electronic source document 30 may include one or more of the familiar elements discussed above, including but not limited to the bank's name, the account holder's name and address, elements from the overview of checking account information, and/or other elements. For example, the extracted information may include the combination of "account holder's name" and "John Johnson." As depicted here, the character sequence "John Johnson" is interpreted as "account holder's name," even though the latter is not literally included in exemplary electronic source document 30. For example, the extracted information may include the combination of "Account Number" and "000 00 300 02 001." As depicted here, both these character sequences may be literally included in exemplary electronic source document 30.

Referring to FIG. 1, interface component 112 may be configured to generate, effectuate, and/or present user interfaces 128 on client computing platforms 104 to users. For example, interface component 112 may be configured to present a particular user interface 128 on a particular client computing platform 104 to a particular user. For example, particular user interface 128 may include one or more portions or sections. The one or more portions and/or sections may include a first portion, a second portion, a third portion, a fourth portion, and so forth. In some implementations, the first portion may present and/or include a visual representation that represents one or more particular electronic source documents 123 (see FIG. 1) such that the visual representation includes the human-readable information included in the particular electronic source documents 123. In some implementations, particular user interface 128 may include a second portion. In some implementations, the second portion may present and/or include one or more sets of fields (i.e., graphical user interface elements that include and/or present certain information). In some implementations, individual fields may include individual character sequences from extracted information 125 (such as, for example, obtained by extraction component 110). In some implementations, individual fields may include combinations of extracted information 125, meta-information, information (such as, for example, obtained by extraction component 110).

Figure 4:
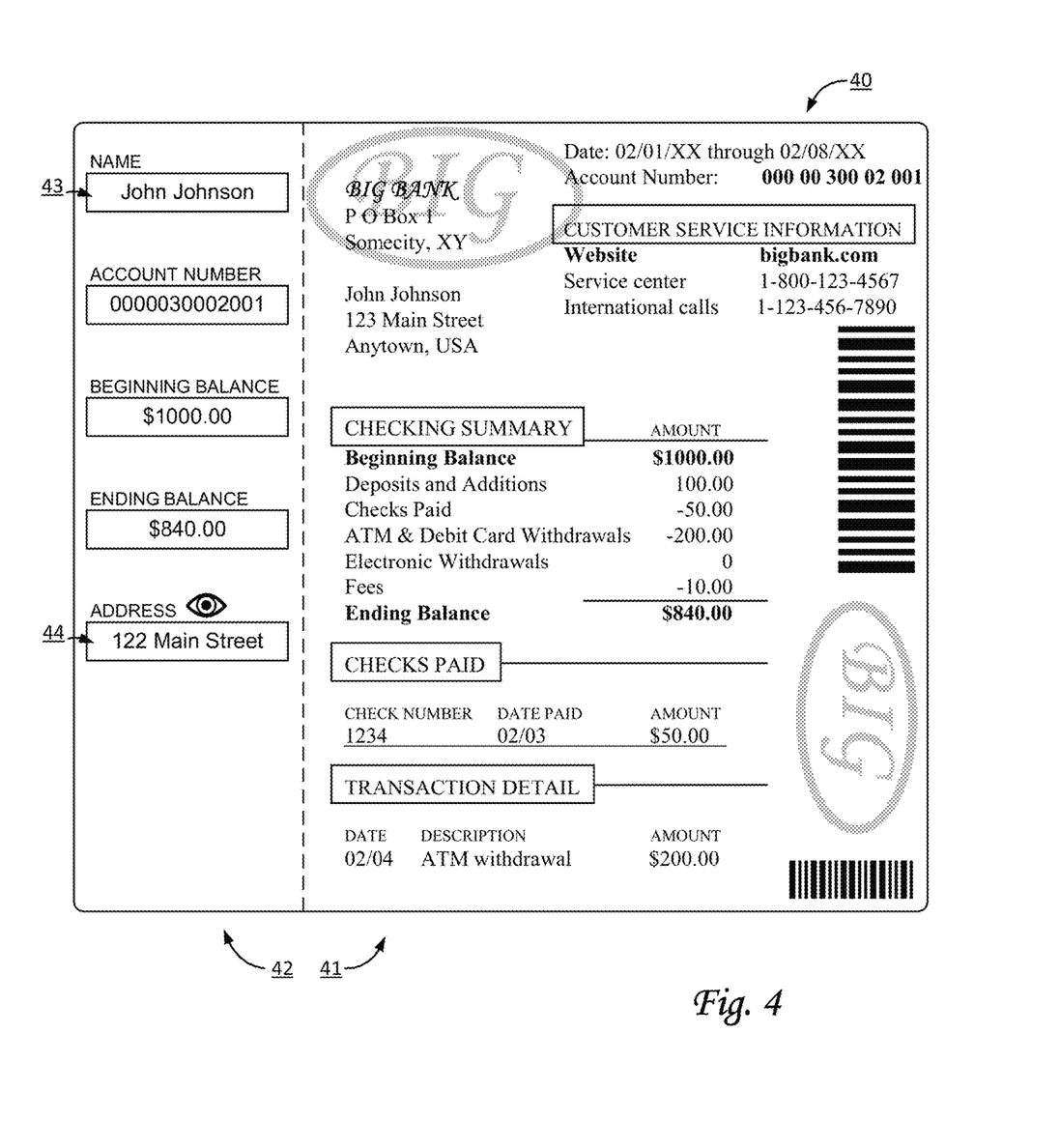
FIGS. 4-5 illustrate exemplary user interfaces as may be provided to facilitate provenance tracking for information extracted from electronic source documents, in accordance with one or more implementations.

By way of non-limiting example, FIG. 4 illustrates exemplary user interface 40 that facilitates provenance tracking for information extracted from electronic source documents, in accordance with one or more implementations. As depicted, exemplary user interface 40 may include a first portion 41, a second portion 42, and/or other portions. First portion 41 may be separated from second portion 42, for example by a dotted line as shown in exemplary user interface 40. First portion 41 may present and/or include a representation of a particular electronic source document (such as, depicted here, a version of exemplary electronic source document 30 from FIG. 3). Second portion 42 may present and/or include a set of fields with extracted information. For example, second portion 42 may include a field 43 that includes a combination of a label labeled "NAME" and a character sequence "John Johnson," as well as additional fields with character sequences labeled "ACCOUNT NUMBER," "BEGINNING BALANCE," "ENDING BALANCE," and a field 44 that includes a combination of a label labeled "ADDRESS" and a character sequence "122 Main Street." Note that second portion 42 further includes an indicator in the shape of an eye, near field 44. In some implementations, one or more indicators may be presented in exemplary user interface 40 that correspond to one or more indications in extracted information, including but not limited to quality indications in meta-information that are included in information extracted from electronic source documents.

Referring to FIG. 1, input component 114 may be configured to receive user input from users, e.g., through user interfaces 128. In some implementations, particular user input may represent a selection by a particular user of a particular field (and/or label) from the presented set of fields. The particular field may include one or more particular character sequences from the extracted information. In some implementations, particular user input may represent a selection by the particular user of a particular character sequence presented in a particular user interface. In other words, the particular user selected the particular character sequence. In some implementations, particular user input may represent a selection by the particular user of a particular indicator (and/or graphical user interface element) presented in a particular user interface.

Figure 5:
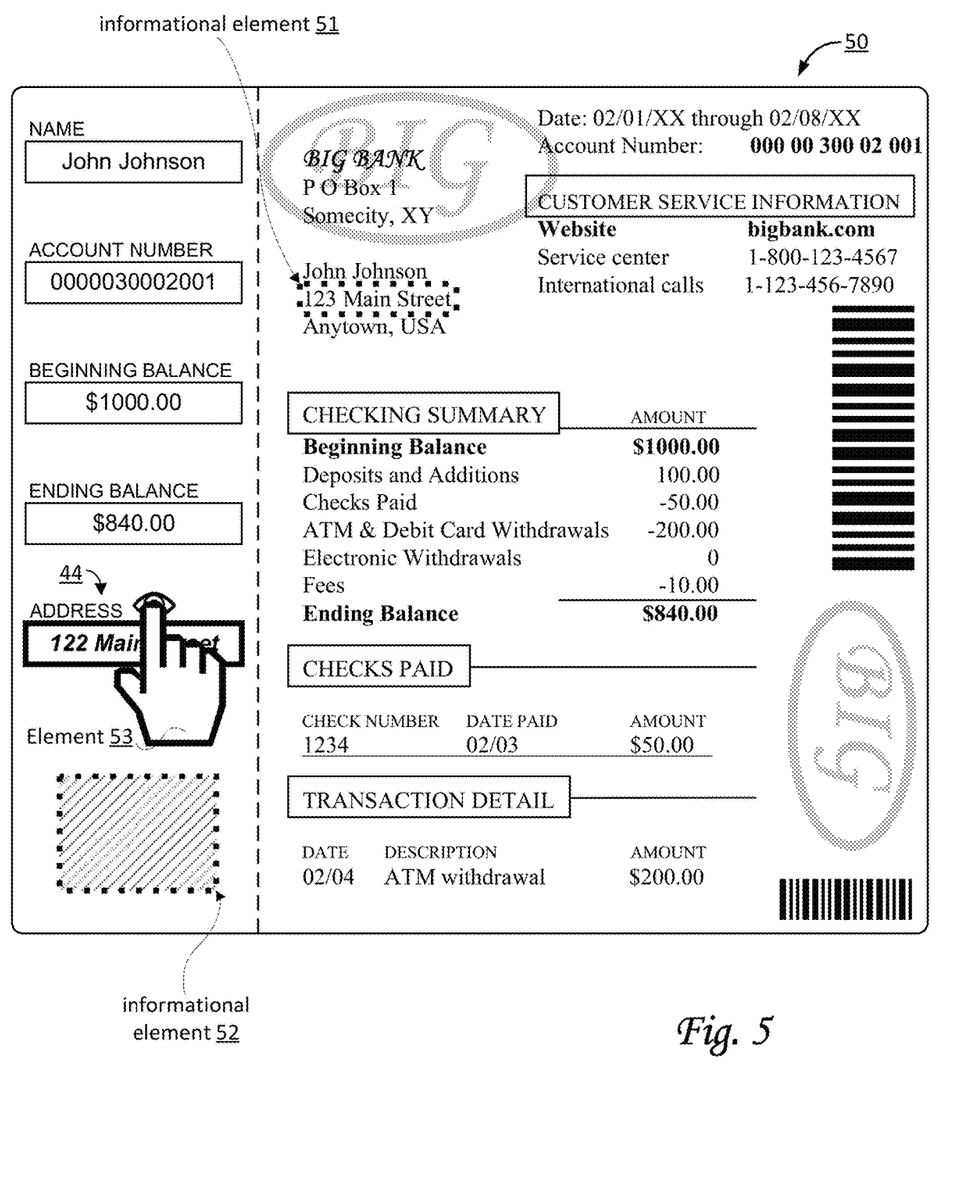

By way of non-limiting example, FIG. 5 illustrates exemplary user interface 50 that facilitates provenance tracking for information extracted from electronic source documents, in accordance with one or more implementations. As depicted, exemplary user interface 50 may be similar to exemplary user interface 40 in FIG. 4. For example, exemplary user interface 50 may include a first portion and a second portion similar to exemplary user interface 40 in FIG. 4. User input in FIG. 5 is depicted by an element 53, which may represent a cursor, a touch on a touchscreen, and/or another type of user input. As shown here, the user provides user input that represents a selection of field 44 (e.g., the user may have selected the indicator that has the shape of an eye). Responsive to this selection, one or more elements of field 44 may be highlighted, boxed, and/or otherwise emphasized to make the selection clearly and easily visible to users. For example, as shown here, a character sequence associated with field 44 may have been bolded and italicized.

Referring to FIG. 1, presentation component 116 may be configured to present one or more graphical user interface elements, responsive to a selection (e.g., through user input received by input component 114). For example, a particular user selected a particular character sequence. The one or more graphical user interface elements may be included in and/or superimposed on the visual representation in a particular portion of user interface 128 such that the one or more graphical user interface elements correspond to a particular section (or particular sections) of electronic source document 123 from which the particular character sequence (i.e., the user-selected particular character sequence) has been extracted. In some implementations, presentation of the particular section to which the one or more graphical user interface elements correspond may be based on one or more positional coordinates (e.g., included in extracted information 125). In some implementations, the provenance of a particular selection may include multiple elements of extracted information, corresponding to multiple different sections of electronic source document 123.

By way of non-limiting example, FIG. 5 illustrates exemplary user interface 50 that facilitates provenance tracking for information extracted from electronic source documents, in accordance with one or more implementations. Responsive to the selection of field 44 by the user, an informational element 51 is presented in exemplary user interface 50, here depicted as a dotted rectangle around a particular portion and/or section such that informational element 51 corresponds to a particular section of the electronic source document from which a particular character sequence (i.e., the user-selected character sequence "122 Main Street") has been extracted. In some implementations, a user may modify the particular character sequence manually, e.g. to change character sequence "122 Main Street" to "123 Main Street." In some implementations, responsive to the selection of field 44 by the user, an informational element 52 may be presented in exemplary user interface 50. For example, informational element 52 may include elements of extracted information pertinent to the selection (e.g., pertinent to the selected character sequence). For example, informational element 52 may include information regarding one or more particular document analysis processes that were used to extract the extracted information pertinent to the selection. For example, informational element 52 may include meta-information pertinent to the selection.

Referring to FIG. 1, analysis component 118 may be configured to analyze extracted information 125 to detect an inconsistency among multiple character sequences that have been extracted from multiple electronic source documents 123. In some implementations, the inconsistency may pertain to at least one particular field from the set of fields that is presented in the second portion (see second portion 42 in FIG. 4) of a particular user interface. In some implementations, one or more graphical user interface elements presented in a particular user interface to a user (e.g., by presentation component 116) may include a particular indicator near a particular field, such as the particular field that pertains to an inconsistency detected by analysis component 118. The particular indicator may indicate detection of the inconsistency. For example, a particular inconsistency may pertain to similar fields (e.g., fields labeled "ACCOUNT NUMBER") with character sequences extracted from multiple different electronic source documents. For example, the multiple different electronic source documents may all represent bank statements for the same account holder and, presumably, the same bank account. For example, a particular inconsistency may pertain to meta-information for similar fields (e.g., fields labeled "AMOUNT") with character sequences extracted from a set of different electronic source documents. For example, the meta-information (e.g., font size) for an individual character sequence may not match the meta-information for other character sequences in the set of different electronic source documents.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users and system 100 and/or between users and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic source documents 123, from which system 100 and/or its components (e.g., document component 108) may obtain information and/or documents. In some implementations, external resources 120 may include a provider of information, including but not limited to extracted information 125, from which system 100 and/or its components (e.g., extraction component 110) may obtain information and/or documents. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, and/or 118, and/or other components. Processor(s) 124 may be configured to execute components 108, 110, 112, 114, 116, and/or 118, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 124 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 124 may be configured to execute one or more additional components that may perform some or all of the functionality attributed below to one of components 108, 110, 112, 114, 116, and/or 118.

Figure 2:
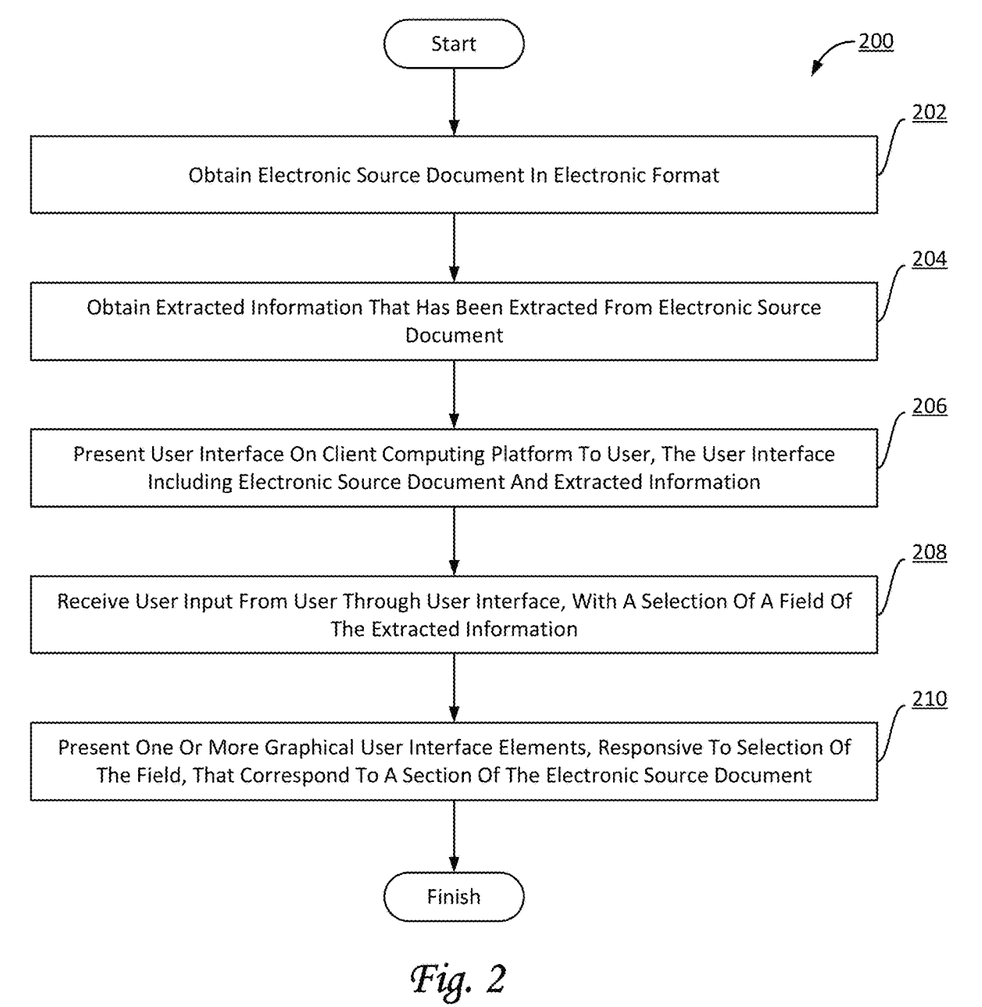
FIG. 2 illustrates a method for providing a user interface that facilitates provenance tracking for information extracted from electronic source documents, in accordance with one or more implementations.

FIG. 2 illustrates a method 200 for providing a user interface that facilitates provenance tracking for information extracted from electronic source documents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining an electronic source document in electronic format. The electronic format may be such that, upon presentation of the electronic source document through a client computing platform to a user. The electronic source document as presented may include human-readable information. Operation 202 may be performed by one or more hardware processors configured by machine-readable instructions including a component that is the same as or similar to document component 108, in accordance with one or more implementations.

An operation 204 may include obtaining extracted information that has been extracted from the electronic source document. The extracted information may include a set of character sequences. Operation 204 may be performed by one or more hardware processors configured by machine-readable instructions including a component that is the same as or similar to extraction component 110, in accordance with one or more implementations.

An operation 206 may include presenting the user interface on the client computing platform to the user. The user interface may include a first portion. The first portion may include a visual representation that represents the electronic source document such that the visual representation includes the human-readable information. The user interface may include a second portion. The second portion may include a set of fields. Individual fields may include individual character sequences from the extracted information. Operation 206 may be performed by one or more hardware processors configured by machine-readable instructions including a component that is the same as or similar to interface component 112, in accordance with one or more implementations.

An operation 208 may include receiving user input from the user through the user interface. The user input may represent a selection by the user of a particular field from the presented set of fields. The particular field may include a particular character sequence from the extracted information. Operation 208 may be performed by one or more hardware processors configured by machine-readable instructions including a component that is the same as or similar to input component 114, in accordance with one or more implementations.

An operation 210 may include presenting one or more graphical user interface elements, responsive to the selection. The one or more graphical user interface elements may be superimposed on the visual representation in the first portion of the user interface such that the one or more graphical user interface elements correspond to a particular section of the electronic source document from which the particular character sequence has been extracted. Operation 210 may be performed by one or more hardware processors configured by machine-readable instructions including a component that is the same as or similar to presentation component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing a user interface that facilitates provenance tracking for information extracted from a set of different electronic source documents, the system comprising:
    one or more hardware processors configured by machine-readable instructions to:
        obtain a first electronic source document in electronic format and a second electronic source document that is related to the first electronic source document, wherein the first electronic source document includes a first bank statement for a particular account holder, wherein the second electronic source document includes a second bank statement for the same particular account holder, wherein the electronic format is such that, upon presentation of the first and second electronic source documents through a client computing platform to a user, the first electronic source document and the second electronic source document as presented include human-readable information, and wherein the first electronic source document is different from the second electronic source document;
        obtain extracted information that has been extracted from the first electronic source document and the second electronic source document, wherein the extracted information includes a set of character sequences and meta-information for the set of character sequences, wherein the set of character sequences includes a first character sequence extracted from the first electronic source document and a second character sequence extracted from the second electronic source document, wherein the meta-information includes information regarding individual character sequences in the set of character sequences, wherein the meta-information regarding the individual character sequences includes one or more of font type, font size, font weight, font color, typographical emphasis, letter case, capitalization, margins, alignment, and/or spacing, wherein the meta-information includes first meta-information regarding the first character sequence and second meta-information regarding the second character sequence;

analyze the extracted information from the first electronic source document and the second electronic source document to detect any inconsistency between the first character sequence and the second character sequence, wherein the inconsistency is detected based on a comparison of the first meta-information of the first character sequence and the second meta-information of the second character sequence;

present the user interface on the client computing platform to the user, wherein the user interface includes a first portion, wherein the first portion includes a visual representation that represents the first bank statement such that the visual representation includes the human-readable information, wherein the user interface includes a second portion, wherein the second portion presents a set of fields, wherein individual fields include individual character sequences from the extracted information, wherein the individual fields include a first field that includes a combination of the first character sequence and a first label that corresponds to the first character sequence, wherein the individual fields include a second field that includes a combination of the second character sequence and a second label that corresponds to the second character sequence, wherein the first label and the second label are the same, wherein the set of fields includes at least the second field such that the presentation of the set of fields includes presentation of the second character sequence and the second label;

receive user input from the user through the user interface, wherein the user input represents a selection by the user of the second field from the presented set of fields; and present a particular indicator, an information element, and one or more graphical user interface elements in the user interface responsive to the selection,
(i) wherein the particular indicator is presented near the second field in the second portion, wherein the particular indicator indicates detection of the inconsistency between the first meta-information of the first character sequence and the second meta-information of the second character sequence,
(ii) wherein the one or more graphical user interface elements are superimposed on the visual representation in the first portion of the user interface such that the one or more graphical user interface elements are superimposed on a particular section of the first bank statement from which the first character sequence has been extracted, wherein the first character sequence and the second character sequence are related by virtue of the first label and the second label being the same, wherein the graphical user interface element is superimposed on the particular section based on the first character sequence and the second character sequence being related, and
(iii) wherein the informational element is presented in the second portion, and wherein the informational element includes information regarding particular meta-information that is pertinent to the selection.

2. The system of claim 1, wherein the extracted information has been extracted by a document analysis process that includes optical character recognition.

3. The system of claim 2, wherein the meta-information further includes indications of levels of confidence in reliability of the document analysis process used to extract the extracted information, and wherein the second portion of the user interface includes indicators that correspond to the indications.

4. The system of claim 1, wherein the extracted information further includes a set of positional coordinates that specify positions within the first electronic source document and the second electronic source document, wherein individual positional coordinates are related to the individual character sequences, wherein presentation of the particular section to which the one or more graphical user interface elements correspond is based on one or more of the individual positional coordinates.

5. The system of claim 1, wherein the first label is related to an account number.

6. The system of claim 1, wherein the first electronic source document represents a financial record, and wherein the first label is related to an amount.

7. The system of claim 1, wherein the first electronic source document includes a photocopy of a physical document from a government agency.

8. A method for providing a user interface that facilitates provenance tracking for information extracted from a set of different electronic source documents, the method comprising:

obtaining a first electronic source document in electronic format and a second electronic source document that is related to the first electronic source document, wherein the first electronic source document includes a first bank statement for a particular account holder, wherein the second electronic source document includes a second bank statement for the same particular account holder, wherein the electronic format is such that, upon presentation of the first and second electronic source documents through a client computing platform to a user, the first electronic source document and the second electronic source document as presented include human-readable information, and wherein the first electronic source document is different from the second electronic source document;

obtaining extracted information that has been extracted from the first electronic source document and the second electronic source document, wherein the extracted information includes a set of character sequences and meta-information for the set of character sequences, wherein the set of character sequences includes a first character sequence extracted from the first electronic source document and a second character sequence extracted from the second electronic source document, wherein the meta-information includes information regarding individual character sequences in the set of character sequences, wherein the meta-information regarding the individual character sequences includes one or more of font type, font size, font weight, font color, typographical emphasis, letter case, capitalization, margins, alignment, and/or spacing, wherein the meta-information includes first meta-information regarding the first character sequence and second meta-information regarding the second character sequence;

analyzing the extracted information from the first electronic source document and the second electronic source document to detect an inconsistency between the first character sequence and the second character sequence, wherein the inconsistency is detected based on a comparison of the first meta-information of the first character sequence and the second meta-information of the second character sequence;

presenting the user interface on the client computing platform to the user, wherein the user interface includes a first portion, wherein the first portion includes a visual representation that represents the first bank statement such that the visual representation includes the human-readable information, wherein the user interface includes a second portion, wherein the second portion presents a set of fields, wherein individual fields include individual character sequences from the extracted information, wherein the individual fields include a first field that includes a combination of the first character sequence and a first label that corresponds to the first character sequence, wherein the individual fields include a second field that includes a combination of the second character sequence and a second label that corresponds to the second character sequence, wherein the first label and the second label are the same, wherein the set of fields includes at least the second field such that the presentation of the set of fields includes presentation of the second character sequence and the second label;

receiving user input from the user through the user interface, wherein the user input represents a selection by the user of the second field from the presented set of fields; and presenting a particular indicator, an informational element, and one or more graphical user interface elements in the user interface responsive to the selection,
(i) wherein the particular indicator is presented near the second field in the second portion, wherein the particular indicator indicates detection of the inconsistency between the first meta-information of the first character sequence and the second meta-information of the second character sequence,
(ii) wherein the one or more graphical user interface elements are superimposed on the visual representation in the first portion of the user interface such that the one or more graphical user interface elements are superimposed on a particular section of the first bank statement from which the first character sequence has been extracted, wherein the first character sequence and the second character sequence are related by virtue of the first label and the second label being the same, wherein the graphical user interface element is superimposed on the particular section based on the first character sequence and the second character sequence being related, and
(iii) wherein the informational element is presented in the second portion, and wherein the informational element includes information regarding particular meta-information that is pertinent to the selection.

9. The method of claim 8, wherein the extracted information has been extracted by a document analysis process that includes optical character recognition.

10. The method of claim 9, wherein the meta-information further includes indications of levels of confidence in reliability of the document analysis process used to extract the extracted information, and wherein the second portion of the user interface includes indicators that correspond to the indications.

11. The method of claim 8, wherein the extracted information further includes a set of positional coordinates that specify positions within the first electronic source document and the second electronic source document, wherein individual positional coordinates are related to the individual character sequences, wherein presentation of the particular section to which the one or more graphical user interface elements correspond is based on one or more of the individual positional coordinates.

12. The method of claim 8, wherein the first label is related to an account number.

13. The method of claim 8, wherein the first electronic source document represents a financial record, and wherein the first label is related to an amount.

14. The method of claim 8, wherein the first electronic source document includes a photocopy of a physical document from a government agency.

* * * * *